Aug. 9, 1938.   A. TIMMERMANN   2,126,294
VARIABLE SPEED GEAR
Filed July 26, 1937   4 Sheets-Sheet 4

INVENTOR
August Timmermann
BY
his ATTORNEYS

Patented Aug. 9, 1938

2,126,294

UNITED STATES PATENT OFFICE 2,126,294

VARIABLE SPEED GEAR

August Timmermann, New York, N. Y.

Application July 26, 1937, Serial No. 155,720

7 Claims. (Cl. 74—115)

My invention relates to a type of variable speed planetary gear drive in which all gears remain in mesh at all times, the variation in speed between the driving and the driven shafts being effected by controlling the speed of the control gear which surrounds the planetary wheels in a particularly novel manner.

The present invention in particular is an improvement on the control wheel drive disclosed in U. S. Patent No. 2,076,926, granted to me on April 13, 1937, the planetary gear arrangement per se being in substance similar to that shown in the aforementioned patent.

My invention is illustrated in the accompanying drawings in which

Figure 1:
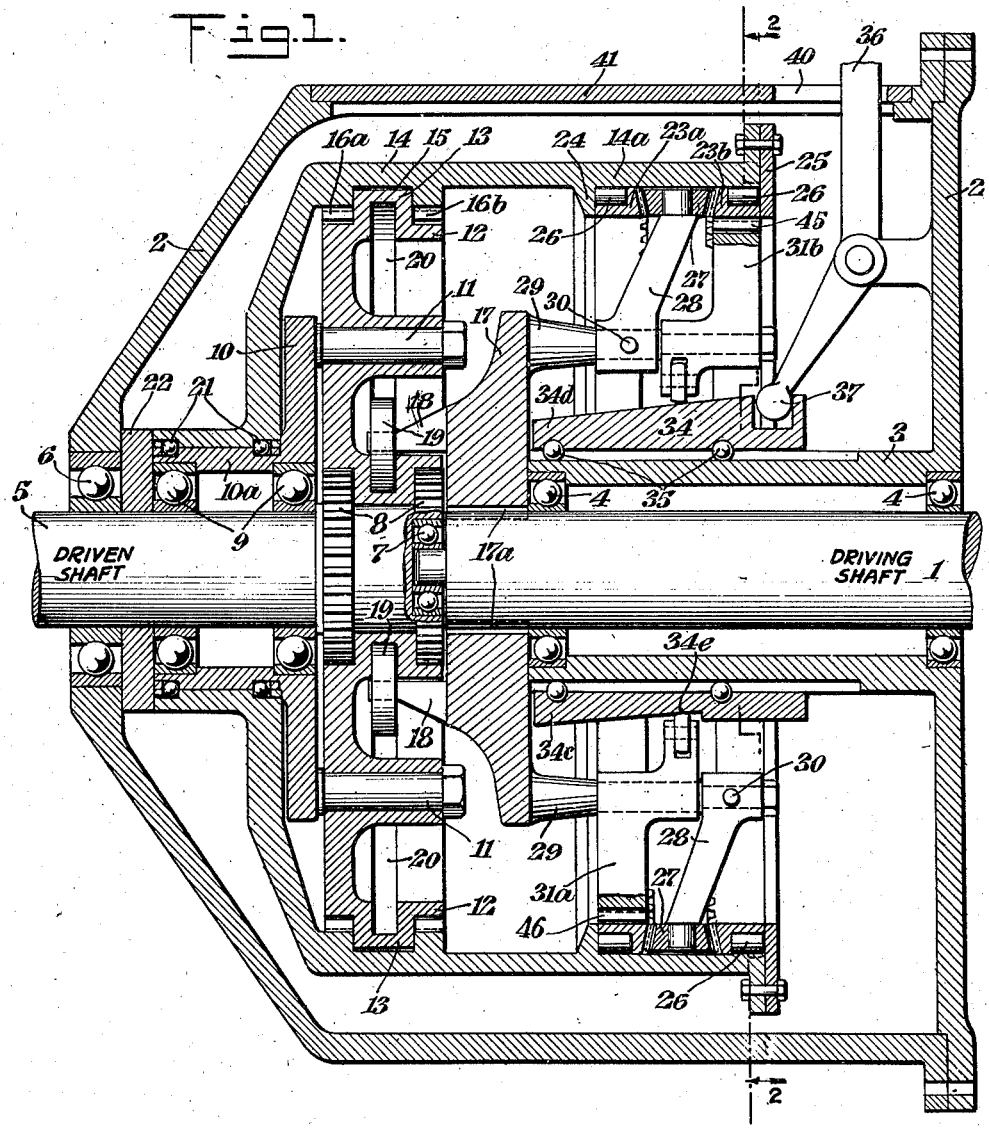
Figure 1 represents a longitudinal sectional elevation of the entire gear drive.
Figure 2:
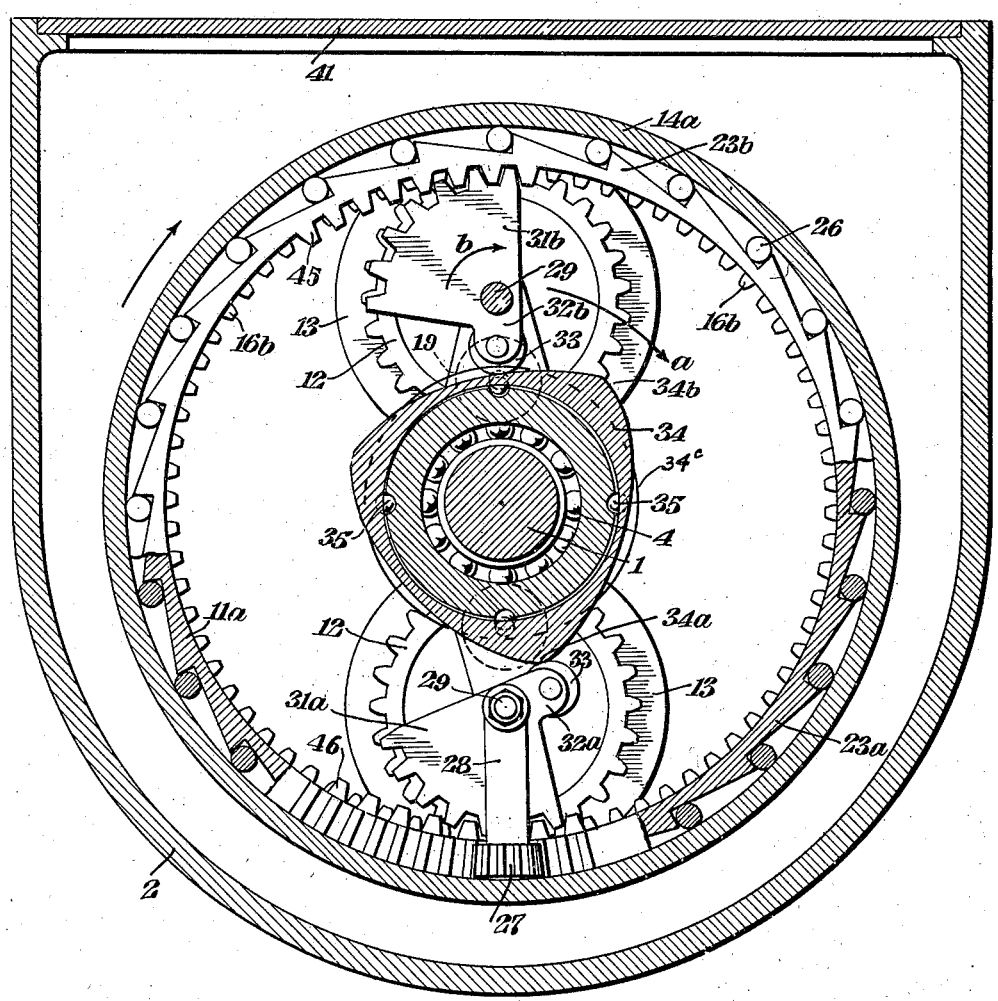
Figure 2 represents an end elevation, partly in section on the line 2—2 in Figure 1
Figure 3:
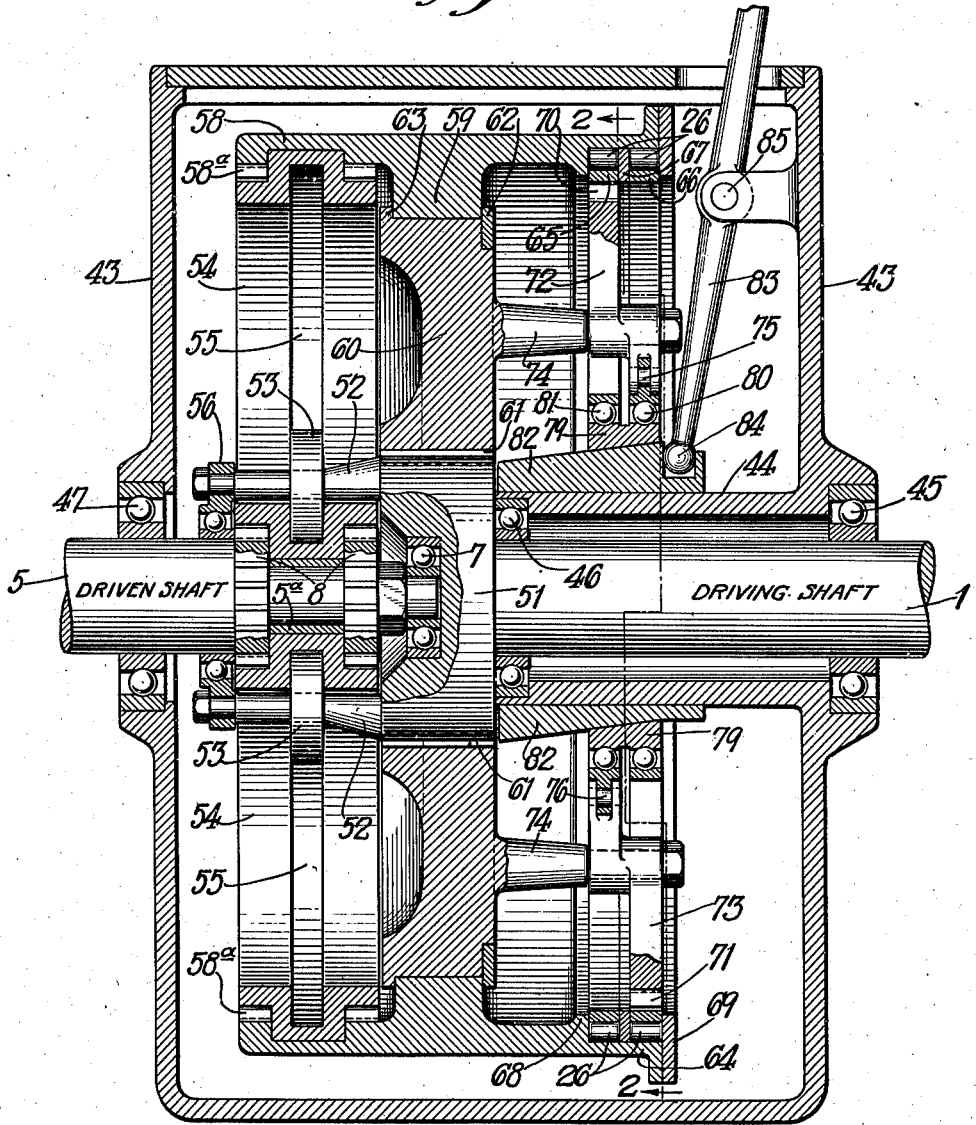
Figure 3 represents in longitudinal sectional elevation a modified form of the gear drive shown in Figure 1.
Figure 4:
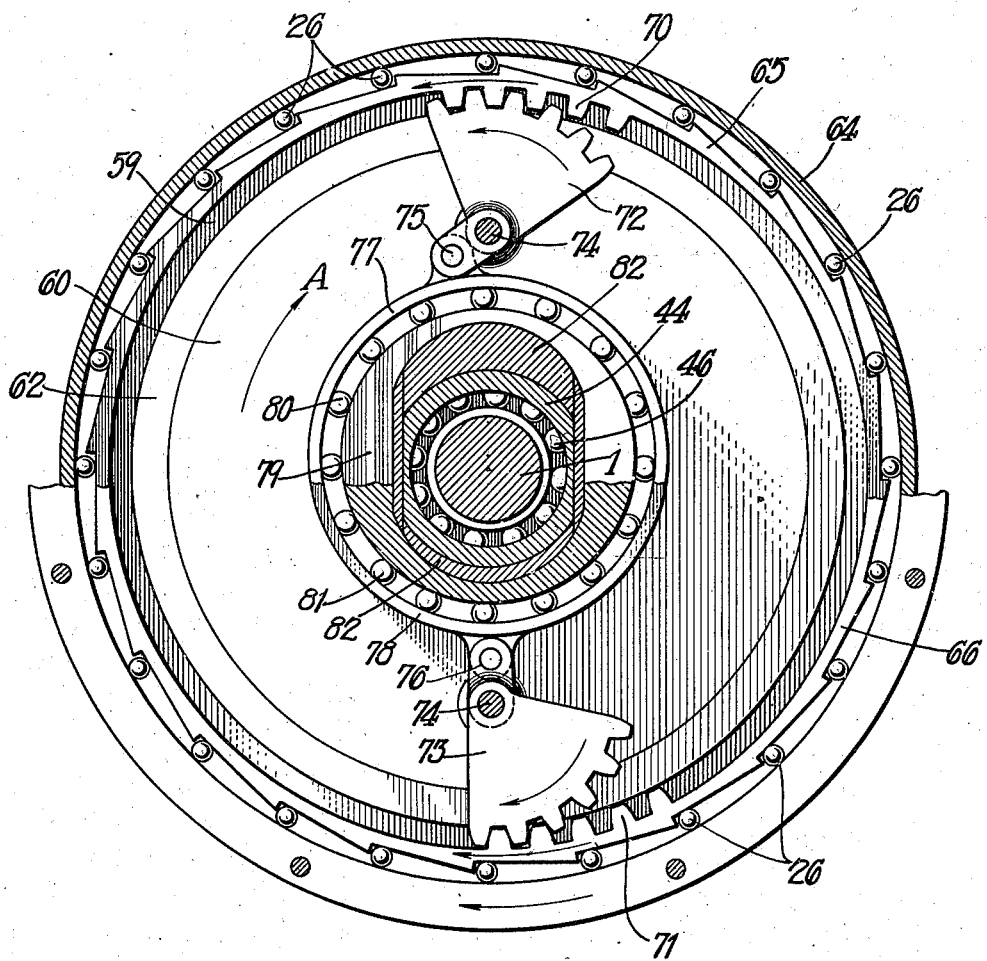
Figure 4 represents an end elevation, partly in section, on line 2—2 of Figure 3, the outer casing being omitted.

The present application constitutes a continuation in part of my application for variable speed gear, Serial No. 129,537, filed March 8, 1937, and allowed July 8, 1937, the subject matter of said application being fully embodied in Figures 1 and 2 of the present application. Figures 3 and 4 of the present application, though involving broadly the same principle as Figures 1 and 2, show a modified and simplified form in which the novel idea may be reduced to practice, and constitute the further development of the principle embodied in Figures 1 and 2 of the earlier application.

It is the particular purpose of the present invention to simplify the manner in which the speed of the control wheel, denoted 13 in Figure 1 of my aforementioned patent, is varied. Especially it is the purpose of the present invention to avoid in such a speed control any outside drive through gears or belts, such as is shown in aforesaid patent, and to confine this speed control to an arrangement located within the compass of the control wheel or gear, so that the entire planetary gear drive may be enclosed within a comparatively small casing.

Referring to Figure 1, I is the driving shaft which is journalled in the gear box 2 by way of a central, inwardly extending sleeve 3 and ball bearings 4. Of course, if desired, roller bearings may be substituted in the present case for the ball bearings in all cases where convenient. The driven shaft 5 is journalled in axial alignment with the driving shaft I in the other end of casing 2 by means of ball bearings 6, the inner end of shaft 5 being journalled in the inner end of drive shaft I by means of ball bearing 7. The inner end of the driven shaft carries two pinions 8, spaced apart and of equal pitch and construction, and of which the left-hand gear may, for instance, constitute an integral portion of shaft 5, while the right-hand pinion is attached to the shaft end by any suitable means known in the art of motor vehicle construction, such as cones, keys, square shaft ends or the like. On the driven shaft 5 is journalled by means of ball bearings 9 a yoke 10 freely rotatable thereon and provided with two diametrically opposite disposed studs 11 which form the bearing for two planetary gears 12. These planetary gears are each provided with a central outer peripheral bead 13 which divides the outer gearing of these wheels into two peripheral halves. This central peripheral bead engages between the two pinions 8 on shaft 5, thereby forming a lateral support for planetary gears 12. The bead has a diameter sufficiently large so as to roll on the portion of shaft 5 located between the pinions 8, thereby maintaining the proper depth of mesh between the teeth of the pinions 8 and of the planetary wheels 12. These planetary wheels are encircled by a control gear wheel 14, the teeth of which are separated in axial direction so that they form two groups 16a and 16b, spaced apart the distance of bead 13 of planetary wheels 12 so that this bead 13 becomes located between these two groups of teeth when the teeth are in mesh with the planetary gears 12.

To the end of driving shaft I is keyed, as shown at 17a, a yoke 17 which has two oppositely disposed studs 18 extending into the interior of planetary gears 12 and which carry at their ends each a roller 19. The inner periphery of each of planetary wheels 12 is provided with a groove 20 which extends into the bead 13 of each wheel slightly below the pitch circle of the wheels, and the aforementioned rollers 19 are located in these peripheral grooves, so that when driving shaft I rotates, planetary wheels 12 are taken along with the tendency to rotate the control wheel 14 in opposite direction. In the present case the control wheel 14 is journalled at 21 freely rotatable on the sleeve 10a of the afore-described yoke 10. A spacing collar 22 is provided between the sleeve 10a and the end of casing 2. Thus according to whether control wheel 14 rotates at the same speed as driving shaft 1, or rotates faster, the speed of the driven shaft will vary in the manner described in my aforementioned patent.

The speed of control wheel 14 is varied and is prevented from rotating in a direction opposite to driving shaft 1 in the following manner. Control wheel 14 has a cylindrical extension 14a which forms a cylindrical casing, and which carries on its inner periphery two serrated overrunning clutch rings 23a and 23b, spaced apart and confined between an inner peripheral ridge 24 of casing 14a and the cover 25 of the casing. These overrunning clutch rings are centered in the conventional manner by rollers 26, which are located between the serrations of the rings and which bear against the inner periphery of casing 14a, as shown more clearly in Figure 2. The two overrunning clutch rings 23a and 23b are held apart by two diametrically opposite disposed pinions 27 which mesh with the lateral faces of clutch rings 23a and 23b. These pinions 27 are mounted rotatably each on an arm 28 keyed at 30, to a stud 29 mounted on yoke 17. Thus assuming for the moment that driving shaft 1 stands still, one clutch ring will rotate in one direction, or tend to do so if the other clutch ring is rotated in the other direction. For instance, if in Figure 2 which shows in the upper half clutch ring 23b in elevation and in the lower half clutch ring 23a partly in section and partly in elevation, clutch ring 23b should be rotated clockwise, the rollers 26 of this clutch ring will engage casing 14a and take this casing along clockwise. At the same time, due to pinions 27 clutch ring 23a will be moved counterclockwise and therefore run free within casing 14a. On the other hand, if clutch ring 23a should be rotated clockwise, its rollers 26 would engage casing 14a and clutch ring 23b would be rotated counterclockwise and thus be disengaged from casing 14a.

The manner in which these two overrunning clutch rings are alternately moved into engaging position with casing 14a and are driven thereby at a speed at which it is desired to drive casing 14a and thus control wheel 14, is as follows. The aforementioned studs 29 besides carrying the fixed arms 28, also carry each a gear sector 31a and 31b respectively. Gear sector 31a meshes with an internal toothing 46 of clutch ring 23a, which toothing extends only over a limited arcuate distance, depending on the number of teeth in sector 31a. Gear sector 31b meshes with an internal toothing 45 provided on clutch ring 23b, and which toothing extends similarly over only a limited distance. Each of these gear sectors is provided with an extension 32b and 32a respectively, each of which carries a cam roller 33 which rolls on a cone-shaped cam 34 splined by means of balls 35 on sleeve 3 of the stationary gear casing 2, so that this cam can be shifted to and fro in axial direction. This shifting may be accomplished by means of a bell crank 36 which engages the cam by means of a ball and socket joint 37. The shape of this cam is shown more specifically in Figure 2. There being provided two oppositely disposed gear sectors 31a and 31b, there must be provided an uneven number of lobes, preferably three, on cam 34 so that when the cam roller 33 of one gear sector (for instance 31b) is at one of the low points of the cam, the roller 33 of the other gear sector (31a) will be at or near one of the high points of the cam.

This arrangement operates as follows: Let us assume that yoke 17 on the driving shaft 1 rotates in clockwise direction, as shown in Figure 2 by the arrow a. In the position shown in Figure 2, roller 33 of gear sector 31b is about to ride from one of the low points on cam 34 toward the high point 34b, while cam roller 33, as aforementioned, has arrived on the high point 34a of cam 34. As yoke 17 continues in clockwise direction, and as roller 33 rides towards the high point 34b, gear sector 31b is rotated clockwise on its stud 29 and thereby also rotates clutch ring 23b clockwise but at an angular speed greater than the angular speed at which yoke 17 rotates. As clutch ring 23b in rotating clockwise engages the control wheel casing 14a, this casing, together with control wheel 14, will be taken along at this increased speed. Thus by the time roller 33 of sector 31b has arrived at the top 34b of cam 34, clutch ring 23b and thus control wheel 14 has run ahead of yoke 17, an angular distance approximately equal to the number of teeth engaged by sector 31b, depending upon the height of the high point 34b of the cam. At that moment sector 31 will be in angular position with respect to its stud, similar to the position in which gear sector 31a is shown in Figure 2, whose roller 33 has just arrived at the high point 34a of the cam 34. The contour of the three-lobed cam 34 is designed so that the roller 33 of gear sector 31b starts its ascent towards the next high point at a time when roller 33 of sector 31a is just over the high point. When clutch ring 23b, as aforedescribed, is thus rotated by gear sector 31b clockwise ahead of the driving yoke 17, it also rotates pinions 27 which are also in mesh with clutch ring 23a, thereby rotating in the manner aforedescribed, this latter clutch ring counterclockwise so that it frees itself from engagement with casing 14a and takes along with it gear sector 31a in counterclockwise direction. Thereby the roller 33 of gear sector 31a rolls down toward the next low point of cam 34. As yoke 17 continues rotating in clockwise direction, now roller 33 of gear sector 31a rolls toward the next high point of cam 34 while roller 33 of gear sector 31b rolls off high point 34b of cam 34. Now gear sector 31a advances clutch ring 23a in clockwise direction, whereby control wheel casing 14a is taken along and continues running ahead of yoke 17, while through pinions 27 clutch ring 23b is disengaged from casing 14a and returns into the position in which it is shown in Figure 2. This forward and backward play of gear sectors 31a and 31b continues so long as rollers 33 alternately engage high and low points of cam 34.

Cam 34 is designed so that its highest highpoints are located near the right-hand end in Figure 1, and its lowest high-points are located near the left-hand end; in fact, near the left-hand end of the cam there are practically no relative high points, the cam being cylindrical at that point (34c, d), and the angular position of each of sectors 31a and 31b would be about midway between the extreme positions of the two gear sectors shown in Figure 2. For this reason, it will be noted, the left end points of cam 34 are shown of equal height, whereas near the righthand end of cam 34 the highest high-point is considerably higher than the left-hand low point 34d, while the lowest low-point 34e of the cam is considerably lower than the left-hand low point 34c. This arrangement is necessary in order to keep at all times the cam rollers in contact with the cam, and to prevent their slapping back and forth when the cam is shifted to the right in order to have all rollers on the low point.

It will thus be observed that as cam 34 is shifted to the right and the high points of the cam become lower and lower, the gear sectors 31a and 31b will perform smaller and smaller angular motions and therefore advance the overrunning clutch rings 23a and 23b smaller and smaller angular distances over the yoke 17 and driving shaft 1, until when all rollers are at the low point and gear sectors 31a and 31b stand still on their respective studs, control casing 14a and thus control wheel 14 are rotated at the same speed as driving shaft 1 and thus the driven shaft 5 is rotated at the same speed. On the other hand, when the control wheel 14 in the manner aforedescribed, runs its maximum angular speed ahead of yoke 17, the driven shaft 5 will run at reverse speed with respect to driving shaft 1, and if the cam stands at some point between its extreme end positions, control wheel 14 runs at a speed which causes driven shaft 5 to stand still—the gear is in neutral.

While I have shown in the drawings only two gear sectors 31a and 31b, as many gear sectors and overrunning clutch rings may be mounted within control wheel casing 14a as may be conveniently placed. In that case, of course also the shape of cam 34 must be correspondingly changed.

The bell crank 36 through which cam 34 is operated, protrudes through a slot 40 provided in cover 41 of the stationary gear casing, so that it can be conveniently handled.

The underlying idea involved in the present invention, as broadly set forth in the annexed claims 1 and 2, may also be reduced to practice in a modified and simplified form, shown in Figures 3 and 4. In these figures, 1 again represents the driving shaft journalled in a sleeve 44 of casing 43 by means of two bearings 45 and 46 provided at the two ends of said sleeve. The driven shaft 5, which is disposed in axial alignment with the driving shaft, is journalled at its inner end within the inner end of driving shaft 1 by means of a bearing 7, and it is also journalled in casing 43 by means of a bearing 47. The driven shaft, similar to the manner shown in Figure 1, has mounted on it the sun wheel 8 arranged in two halves axially spaced apart so as to provide a groove within which the planetary ring gears 54 are guided, these ring gears meshing with the corresponding sun wheel portions in a manner similar to that shown and explained in my aforementioned U. S. Patent No. 2,076,926. Similar to the manner also shown in this patent, these ring gears are provided with a central peripheral groove 55 in which engage driving rollers 53 rotatably mounted on two diametrically opposite studs 52 provided on head 51 of driving shaft 1. The outer ends of studs 52 are secured to a holding ring 56 journalled by means of a bearing 57 on the driven shaft 5.

Planetary rings 54 are surrounded by and in mesh with control gear 58 which for that purpose is provided with a split inner toothing 58a and a guide groove similar to the manner shown in Figure 1 of the present application.

Control gear 58 is extended in axial direction and provided in this extension with a wide inner peripheral bead 59 by which it is rotatably mounted on a disc 60, keyed at 61 to the driving shaft head 51. This bead 59 is secured in axial direction on disc 60 between a peripheral shoulder 63 and a retaining ring 62.

So far as described, this arrangement operates similar to the manner described with reference to Figures 1 and 2, namely, when the driving shaft 1 is rotated, the rollers 53 take along the ring gears 54, and by controlling the speed of control wheel 58, the speed of the sun wheel and thus of the driven shaft can be controlled.

The speed of control wheel 58 is varied and the wheel prevented from rotating in a direction opposite to driving shaft 1 in the present modification, in the following manner: Control wheel 58 has a cylindrical extension 64 which forms a cylindrical casing and which carries on its inner periphery two serrated overrunning clutch rings 65 and 66 whose teeth are pitched in the same direction, the rings being spaced apart by means of a spacing ring 67 and confined rotatably between an inner peripheral ridge 68 on casing 64 and retaining ring 69. These overrunning clutch rings are centered in the conventional manner by rollers 26 which are located between the serrations of the rings and which bear against the inner periphery of casing 64, as shown clearly in Figure 4, in which clutch ring 65 is visible in the upper half of the figure and clutch ring 66 in the lower half. As will appear more clearly in Figure 4, clutch ring 65 is provided with a short inner peripheral toothed portion 70 of a few teeth, for instance five in the present case, and clutch ring 71 is provided diametrically opposite from the toothed portion 70 of the clutch ring 65 with a similar number of inner peripheral teeth 71. These two toothed segment portions mesh respectively with toothed sectors 72 and 73 which are each rotatably mounted on a stud 74 provided on disc 60 so that these toothed sectors are bodily rotated with the driving shaft 1. Assuming for a moment that both sectors 72 and 73 are held fast on their pivotal point and assuming further that the driving shaft and thus disc 60 rotates in the direction of the arrow A in Figure 4, both overrunning clutch rings 65 and 66 will be taken along by their respective sectors in the same direction and thus, by the action of the clutch rollers 26 engage casing 64 and control wheel 58 and thus will rotate the control wheel in the same direction at the speed of the driving shaft. Thus, the driven shaft will also be taken along at the same speed; in other words, both shafts are coupled together and the whole system would rotate as a unit. In order to vary the relative speed between the driving shaft and control wheel 58, the aforementioned sectors 72 and 73 are each pivotally attached at 75 and 76 respectively to an individual eccentric ring 77 and 78 respectively. These eccentric rings are mounted on a common eccenter disc 79 by means of ball bearings 80 and 81 respectively. The eccentricity of eccenter disc 79 can be varied with respect to the central axis of driving shaft 1 by means of a sliding block 82 slidingly mounted on casing sleeve 44 in axial direction and provided at diametrically opposite sides with inclined sliding surfaces parallel to one another but pitched at an angle with respect to the axis of driving shaft 1, so that when sliding block 82 is moved axially in one or the other direction, the eccentricity of rings 77 and 78 can be set to a maximum value, such as is shown in Figure 3, or by shifting block 82 gradually to the right, the eccentricity can be lessened until in the extreme right-hand position of block 82 the eccentricity of eccenter disc 79 and rings 77 and 78 is zero with respect to the driving shaft axis.

With this arrangement, it will be noted that when disc 60 is rotated as aforedescribed and sectors 72 and 73 are taken along in the direction of the arrow, and if we assume that the eccentrics are set for their maximum eccentricity, eccentric rings 77 and 78 will cause their respective sectors 72 and 73 to rock on their pivotal supports 74. This has the following effect: In Figure 4, the pivotal point 76 at which eccentric ring 78 is attached to sector 73, is nearest the center of driving shaft 1. If now the driving shaft together with disc 60 continues to rotate in the direction of the arrow A, the radius between the center of the driving shaft and pivotal point 76 will gradually increase whereby sector 73 will be rocked in the direction of the arrow attached to that sector. Thereby clutch ring 66 through its gear teeth 71 will be moved in the direction of the arrow ahead of the rotation speed of driving shaft 1. Thereby clutch ring 71 through the rollers 26 engages the cylindrical casing 64 of the control wheel 58 and thus rotates the latter ahead of the driving shaft 1 an angular distance approximately equal to the number of teeth engaged by sector 73, which in turn depends upon the angle through which sector 73 moves. At the same time when eccentric ring 78 operates gear sector 73 as described, eccentric ring 77 rotates sector 72 in the direction of the arrow marked on that sector and thereby moves clutch ring 65 in the direction of the arrow, i. e. opposite to the direction in which clutch ring 71 is moved. Clutch ring 65 can be freely moved in that direction owing to the construction of the overrunning clutch rings. As soon as sector 73 has completed its advance of its clutch ring 71, sector 72 has completed the counterclockwise retardation of its clutch ring 65 and the eccentric rings now move the sectors 72 and 73 respectively in opposite direction, namely, sector 72 is then moved clockwise and causes the engagement of its clutch ring 65 with casing 64 thereby moving it clockwise ahead of shaft 1, while sector 73 unlocks its clutch ring 66 from casing 64 and withdraws it in counterclockwise direction. Thus the two sectors 72 and 73 alternately advance and retard and alternately thereby move the casing 64 of control wheel 58 and thereby the control wheel itself ahead of driving shaft 1.

If now sliding block 82 which carries the eccentric disc 79 is moved to the right (Figure 3) by means of shifting lever 53 pivoted at 85 on casing 43 and engaging block 82 at the ball and socket joint 84, the eccentricity of disc 79 is gradually lessened more and more with respect to the center of shaft 1 until in the extreme right-hand position of block 82 the eccentricity of disc 79 becomes zero and the eccentric rings 77 and 78 do not move their respective sectors 72 and 73. Both sectors in this case take their respective clutch rings 65 and 66 along in clockwise direction; both clutch rings engage casing 64 and thereby move the control wheel 58 at the speed of the driving shaft. In this case the driven shaft will rotate at the same speed as the driving shaft; in other words, the whole gear system rotates as a unit about the axis of the driving and driven shafts and no parts within the gear system move relatively to one another. The transmission is in high gear. If sliding block 82 in Figure 3 is gradually moved from the extreme right-hand position toward the left, the eccentricity of eccentric disc 79 increases and thus sectors 72 and 73 commence to advance control wheel 58 ahead of the driving shaft speed, depending upon the extent of the eccentricity, whereby the driven shaft runs slower and slower until at about the middle position of sliding block 82 the control wheel 58 runs ahead of driving shaft 1 at a speed at which the driven shaft 5 stands still. The gear is in neutral. If block 82 is shifted further to the left, for instance into the position shown in Figure 3, the eccentricity of disc 79 is at a maximum and control wheel 58 runs its maximum amount ahead of driving shaft 1 whereby the driven shaft is moved in reverse direction. The gear is in reverse.

I claim:—

1. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, and means actuated by the driving shaft for alternately advancing each clutch ring in the driving direction a desired angular degree and simultaneously retarding the other ring to the same degree in the other direction.

2. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, and means actuated by the driving shaft for alternately advancing each clutch ring in the driving direction a desired angular degree and simultaneously retarding the other ring to the same degree in the other direction, and means controllable from outside for varying the degree of advance of said rings.

3. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, a gear sector for each clutch ring pivotally mounted on the driving shaft and meshing with its appertaining ring, a normally stationary cam body and a cam roller on each sector disposed to engage the cam surface of said body, said cam body being designed to rock said sectors alternately on their own pivot when the driving shaft rotates and the sector rollers pass over a high point of the cam body, so that each sector advances alterately its appertaining clutch ring angularly with respect to the driving shaft, and pinions geared between said clutch rings and mounted on said driving shaft to bodily rotate therewith, said pinions causing the clutch ring advanced by a high point of the cam to simultaneously retard the other clutch ring to the same degree to throw the cam roller of the gear sector for said other ring onto the cam low point of said cam body which is in radial alignment with that roller.

4. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, a gear sector for each clutch ring pivotally mounted on the driving shaft and meshing with its appertaining ring, a normally stationary cam body and a cam roller on each sector disposed to engage the cam surface of said body, said cam body being designed to rock said sectors alternately on their own pivots when the driving shaft rotates and the sector rollers pass over a high point of the cam body, so that each sector advances alternately its appertaining clutch ring angularly with respect to the driving shaft, and pinions geared between said clutch rings and mounted on said driving shaft to bodily rotate therewith, said pinions causing the clutch ring advanced by a high point of the cam to simultaneously retard the other clutch ring to the same degree to throw the cam roller of the gear sector for said other ring onto the cam low point of said cam body which is in radial alignment with that roller, said cam body having a circumferential cam contour which varies in height in the direction of the longitudinal cam axis, and means for longitudinally shifting said cam body to vary the degree of advance of said clutch rings.

5. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, a gear sector for each clutch ring pivotally mounted to rotate bodily with the driving shaft and meshing with its appertaining clutch ring, a stationary eccentric disc surrounding said driving shaft, two eccenter rings independently rotatably mounted on said disc, each ring being pivotally attached to one of said gear sectors to rock its sector on its own pivot alternately in opposite direction with respect to the other sector when the driving shaft rotates, so that each sector advances and retards alternately with the other sector its appertaining clutch ring angularly with respect to the driving shaft, whereby each clutch ring alternately with the other ring is engaged with and from said control gear and the control gear is rotated ahead of the driving shaft to an extent determined by the rocking motions of said sectors.

6. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, a gear sector for each clutch ring pivotally mounted to rotate bodily with the driving shaft and meshing with its appertaining clutch ring, a stationary eccentric disc surrounding said driving shaft, two eccenter rings independently rotatably mounted on said disc, each ring being pivotally attached to one of said gear sectors to rock its sector on its own pivot alternately in opposite direction with respect to the other sector when the driving shaft rotates, so that each sector advances and retards alternately with the other sector its appertaining clutch ring angularly with respect to the driving shaft, whereby each clutch ring alternately with the other ring is engaged with and from said control gear and the control gear is rotated ahead of the driving shaft to an extent determined by the rocking motions of said sectors, and means for varying the eccentricity of said disc with respect to the driving shaft axis to vary the rocking motions of said sectors.

7. A planetary gear drive between a driving and a driven shaft, having a sun gear wheel mounted on the driven shaft, planetary gear wheels in mesh with said sun wheel and operated by the driving shaft to rotate around said sun wheel and a control gear wheel in mesh with and surrounding said planetary gear wheels and means for operating said control gear at varying speeds with respect to the driving shaft, said means comprising a pair of overrunning clutch rings disposed to engage said control gear when rotating in the same direction as the latter and to become disengaged when rotated in opposite direction, a gear sector for each clutch ring pivotally mounted to rotate bodily with the driving shaft and meshing with its appertaining clutch ring, a stationary eccentric disc surrounding said driving shaft, two eccenter rings independently rotatably mounted on said disc, each ring being pivotally attached to one of said gear sectors to rock its sector on its own pivot alternately in opposite direction with respect to the other sector when the driving shaft rotates, so that each sector advances and retards alternately with the other sector its appertaining clutch ring angularly with respect to the driving shaft, whereby each clutch ring alternately with the other ring is engaged with and from said control gear and the control gear is rotated ahead of the driving shaft to an extent determined by the rocking motions of said sectors, a normally stationary sliding block for supporting said eccentric disc and being designed to vary the eccentricity of said disc with respect to the driving shaft axis when slidingly moved in axial direction, to vary the rocking motions of said sectors.

AUGUST TIMMERMANN.